US012614332B2

(12) United States Patent
Yoo et al.

(10) Patent No.: US 12,614,332 B2
(45) Date of Patent: Apr. 28, 2026

(54) SYSTEMS AND METHODS FOR AUTOMATED RIGGING AND GENERATING ANIMATIONS BASED ON REAL MUSCULOSKELETAL MOVEMENTS

(71) Applicant: Illuscio, Inc., Culver City, CA (US)

(72) Inventors: Nolan Taeksang Yoo, Seattle, WA (US); Dwayne Elahie, Montreal (CA); Kevin Edward Dean, Greenwood, IN (US)

(73) Assignee: Illuscio, Inc., Culver City, CA (US)

( * ) Notice: Subject to any disclaimer, the term of this patent is extended or adjusted under 35 U.S.C. 154(b) by 143 days.

(21) Appl. No.: 18/665,092

(22) Filed: May 15, 2024

(65) Prior Publication Data

US 2025/0356564 A1 Nov. 20, 2025

(51) Int. Cl.
*G06T 13/40* (2011.01)
*G06T 17/20* (2006.01)

(52) U.S. Cl.
CPC .............. *G06T 13/40* (2013.01); *G06T 17/20* (2013.01); *G06T 2210/41* (2013.01)

(58) Field of Classification Search
CPC ......... G06T 17/20; G06T 17/00; G06T 15/00; G06T 15/08; G06T 2210/41; G06T 19/00;

G06T 15/205; G06T 13/40; G06T 17/10; G06T 2207/30201; G06T 2207/30008; G06T 2207/30196; G06F 3/016
See application file for complete search history.

(56) References Cited

U.S. PATENT DOCUMENTS

2022/0092838 A1* 3/2022 Choi ...................... G06T 17/00

* cited by examiner

*Primary Examiner* — Hau H Nguyen
(74) *Attorney, Agent, or Firm* — Ansari Katiraei LLP; Arman Katiraei; Sadiq Ansari

(57) ABSTRACT

A three-dimensional (3D) animation system and associated methods generate a musculoskeletal framework for a 3D model, automatically rig virtual muscles and virtual bones of the musculoskeletal framework to the 3D model, and realistically animate the 3D model based on real musculoskeletal movements associated with the virtual muscles and the virtual bones. The 3D animation system receives multiple scans of a subject, generates primitives that form a 3D model of the subject based on a first scan, and rig the 3D model for animation with the virtual muscles and virtual bones of the musculoskeletal framework that are defined from data of other scans. The 3D animation system animates the 3D model by determining an association between a virtual muscle and a set of primitives created from the rigging, and by adjusting the set of primitives according to a movement created from a simulated contraction of the virtual muscle.

20 Claims, 8 Drawing Sheets

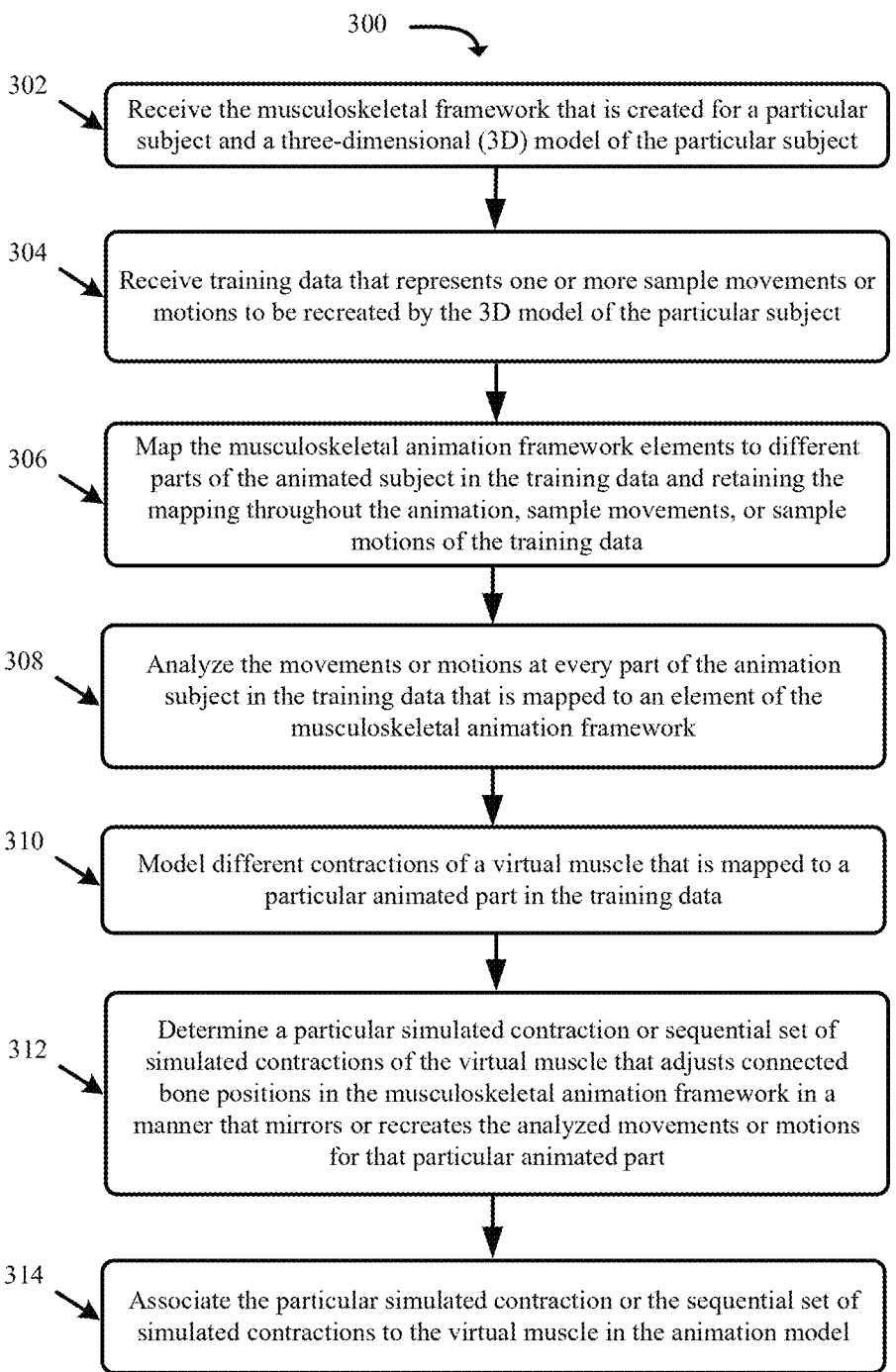

300

302 — Receive the musculoskeletal framework that is created for a particular subject and a three-dimensional (3D) model of the particular subject 304 — Receive training data that represents one or more sample movements or motions to be recreated by the 3D model of the particular subject 306 — Map the musculoskeletal animation framework elements to different parts of the animated subject in the training data and retaining the mapping throughout the animation, sample movements, or sample motions of the training data 308 — Analyze the movements or motions at every part of the animation subject in the training data that is mapped to an element of the musculoskeletal animation framework 310 — Model different contractions of a virtual muscle that is mapped to a particular animated part in the training data 312 — Determine a particular simulated contraction or sequential set of simulated contractions of the virtual muscle that adjusts connected bone positions in the musculoskeletal animation framework in a manner that mirrors or recreates the analyzed movements or motions for that particular animated part 314 — Associate the particular simulated contraction or the sequential set of simulated contractions to the virtual muscle in the animation model

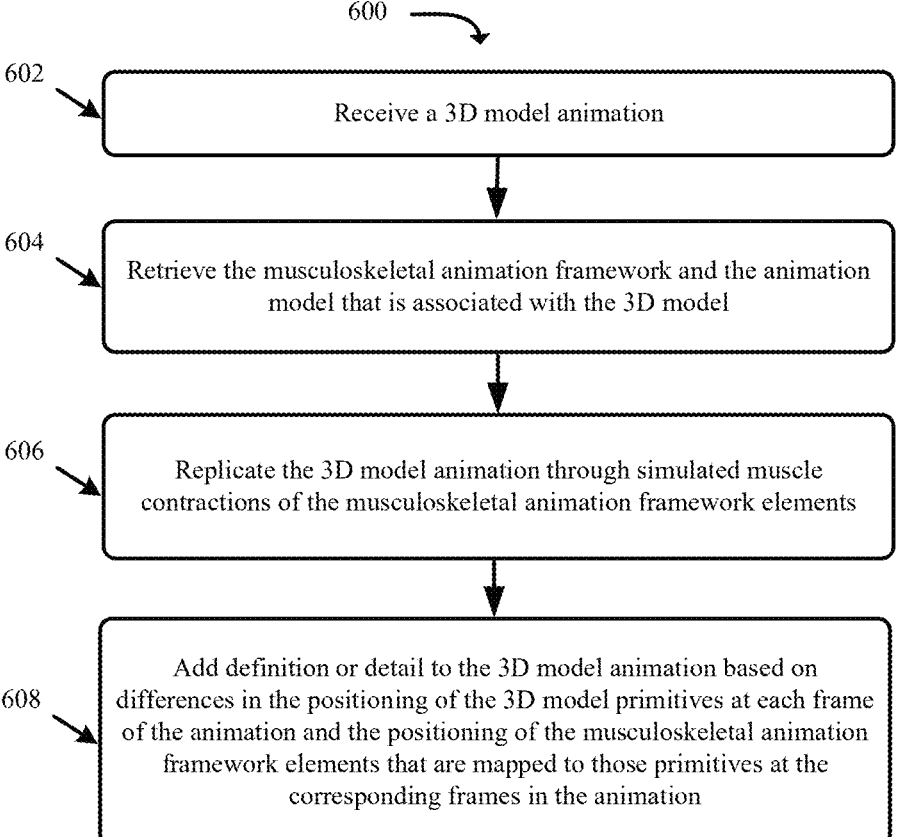

600

602
Receive a 3D model animation

604
Retrieve the musculoskeletal animation framework and the animation model that is associated with the 3D model 606
Replicate the 3D model animation through simulated muscle contractions of the musculoskeletal animation framework elements 608
Add definition or detail to the 3D model animation based on differences in the positioning of the 3D model primitives at each frame of the animation and the positioning of the musculoskeletal animation framework elements that are mapped to those primitives at the corresponding frames in the animation

SYSTEMS AND METHODS FOR AUTOMATED RIGGING AND GENERATING ANIMATIONS BASED ON REAL MUSCULOSKELETAL MOVEMENTS

BACKGROUND

Animation that is defined using motion capture lacks realistic definition. For instance, motion capture technology tracks movement at specific points about a subject. Movements occurring between those points are approximated or calculated. The approximated or calculated movements fail to recreate actual muscle contractions, skin elasticity, and/or other intricate movements.

Other animation techniques include manually rigging a digital model with a skeletal framework so that different parts of the digital model move in combination with movements that are defined for different bones or joints of the skeletal framework. Here again, the animation lacks realism because muscle contractions and other definition associated with a movement is lost.

To enhance the realism, simulated muscles may be manually added to the skeletal framework. A simulated muscle may be defined to move in relation to a movement that is defined for an associated bone of the skeletal framework. The simulated muscle may create a generalized muscle movement rather than the actual muscle movement associated with the limb or body part movement. In other words, the simulated muscles and their movements are defined after movements are defined for the skeletal framework and/or model body parts. Accordingly, the movements of the added simulated muscle differ from the movements of an actual muscle since the simulated muscle moves in response to movements that are defined for the associated bone, whereas actual muscles control the movements of the associated bones. In other words, animation techniques determine how a bone of the skeletal framework is moved and approximate how the simulated muscle attached to that bone should move, whereas, in living creatures, the contraction and/or movement of the muscle determines how the bone moves.

BRIEF DESCRIPTION OF THE DRAWINGS

FIG. 3 presents a process for training an animation model for the musculoskeletal animation framework to replicate realistic motion in accordance with some embodiments presented herein.

FIG. 6 presents a process for enhancing an animation using the musculoskeletal animation framework and an associated animation model in accordance with some embodiments presented herein.

DETAILED DESCRIPTION OF PREFERRED EMBODIMENTS

The following detailed description refers to the accompanying drawings. The same reference numbers in different drawings may identify the same or similar elements.

Disclosed are systems and associated methods for automated rigging and generating animations based on real musculoskeletal movements. The automated rigging includes automatically defining a musculoskeletal animation framework of a subject, and associating the musculoskeletal animation framework to a three-dimensional (3D) model of the subject. Realistic animations may be created by controlling movements and specifying adjustments to the 3D model based on a mapping of actual motions supported by the musculoskeletal animation framework to the primitives of the 3D model.

To create the realistic musculoskeletal movements, a 3D animation system obtains scans of the subject's internal structures. The scans may include images or scans of the epidermal or outer layer of the subject, x-ray images or scans of the subject's skeletal framework, ultrasound images or scans of the subject's muscular system, and/or other images or scans of internal body parts that control physical movement of the subject (e.g., the subject's nervous system, vascular system, etc.).

The 3D animation system enters the scans with one or more training data that represents or captures different ranges of motion or sample motions for the subject into one or more artificial intelligence and/or machine learning (AI/ML) techniques. The AI/ML techniques analyze the subject movements in the one or more training data, determine movements for the muscles and connected bones in the scans that modify the outer layer scan to match the subject movements in the one or more training data, and define an animation model to associate the determined movements of different muscles that realistically recreate the different movements in the training data. In other words, the AI/ML techniques determine movements of the underlying muscles and bones that produce the outer layer movements in the one or more training data. The 3D animation system may realistically animate a 3D model of the subject by manipulating primitives that form the outer layer of the 3D model according to the modeled movements of the muscles and bones from the musculoskeletal scans that are synchronized or aligned with the scan of the subject outer layer represented by the 3D model.

Figure 1:
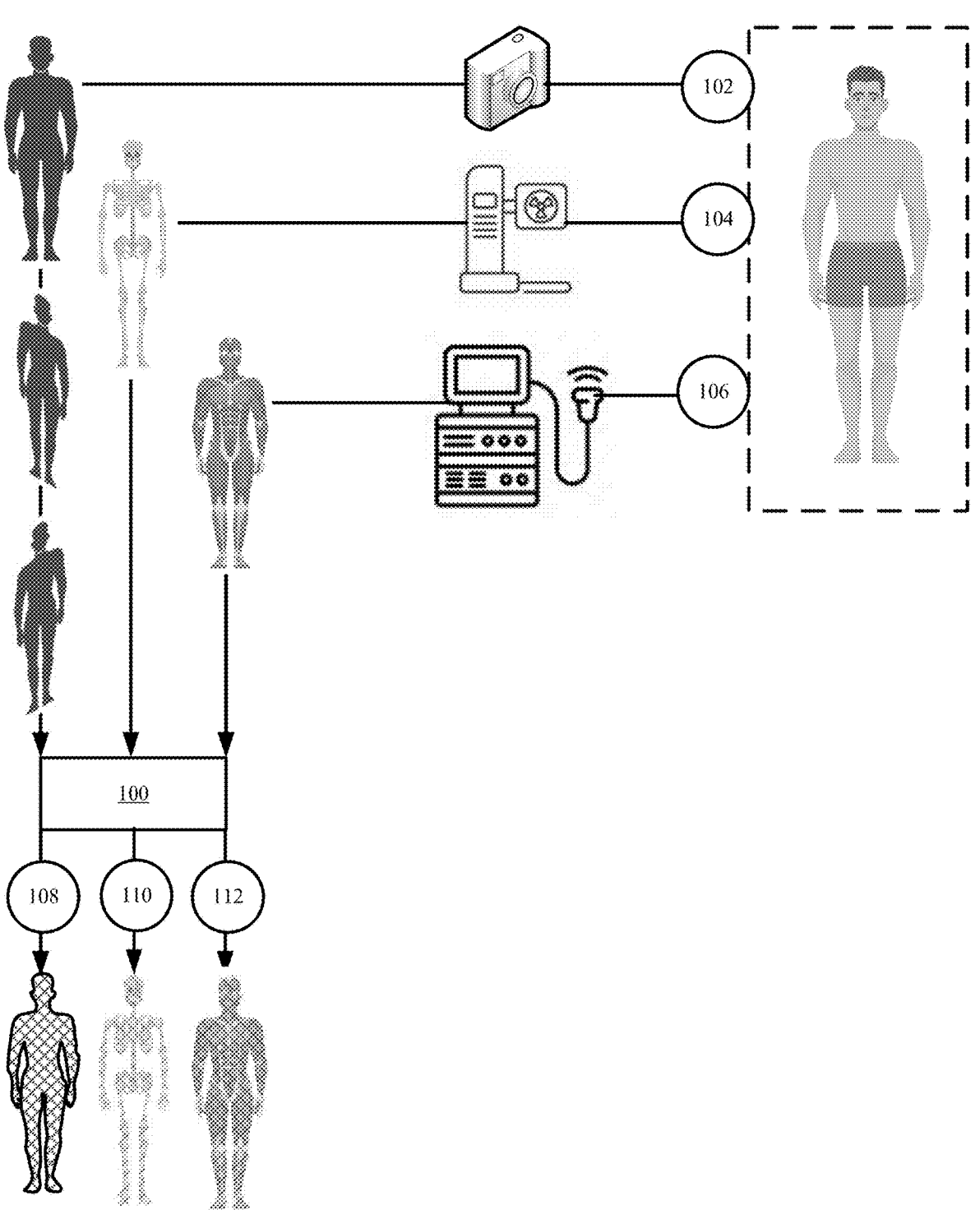
FIG. 1 illustrates an example of different scans for constructing a musculoskeletal animation framework with that is used to rig to a three-dimensional (3D) model for animation in accordance with some embodiments presented herein.

FIG. 1 illustrates an example of different scans for constructing a musculoskeletal animation framework with that is used to rig to a 3D model for animation in accordance with some embodiments presented herein. 3D animation system 100 obtains the different scans of a subject by imaging or scanning (at 102, 104, and 106) the subject with different imaging or scanning equipment. The different scans may include a 3D visual capture, x-ray scan, and ultrasound scan of the subject in the same position.

In some embodiments, a camera may be used to image (at 102) the epidermal or outer layer of the subject from all sides. 3D animation system 100 may use photogrammetry to generate (at 108) a 3D model of the subject from the images. In some other embodiments, Light Detection and Ranging (LiDAR) or other imaging techniques may be used to capture or measure (at 102) the 3D shape and form of the subject and generate (at 108) the 3D model for the outward appearance of the subject. The 3D model may include a point cloud, mesh model, or other 3D representation of the subject. For instance, the point cloud representation may create the 3D form, shape, and size of the subject with a disconnected set of points that are distributed across a 3D space at positions corresponding to the imaged or scanned epidermal or outer surface of the subject.

X-ray imaging may be used to generate (at 104) a second scan of the subject. Specifically, the x-ray imaging may be used to image the shape, size, and positioning of the bones and/or skeletal framework of the subject. 3D animation system 100 may convert or define (at 110) the second scan in a similar format as the generated (at 108) 3D model. For instance, 3D animation system 100 may convert the second scan into a point cloud or mesh model such that the imaged bones are represented as different sets of points or different connected sets of polygons.

Ultrasound imaging may be used to generate (at 106) a third scan of the subject. The ultrasound imaging maps the muscles or muscular system of the subject that lie below the epidermal or outer layer and over the bones or skeletal layer of the subject. The third scan provides a detailed mapping of the shape, size, and positioning of each of the subject's muscles. 3D animation system 100 may convert or define (at 112) the third scan into a point cloud or mesh model format for subsequent processing.

Other equipment may be used to generate additional scans of the subject body for an even more detailed representation of the subject body. In some embodiments, Computed Tomography (CT) or Computed Axial Tomography (CAT) scans of the subject body may provide additional imaging of the subject's bones or skeletal framework as well as various soft tissues (e.g., organs within the body). In some embodiments, Magnetic Resonance Imaging (MRI) may be used to map the subject's nervous system, ligaments, tendons, and/or other structures that may further increase the accuracy or realism of the subject's movements.

3D animation system 100 aligns or synchronizes the different scans or the converted scans so that the positioning of each imaged or scanned body part or inner structure (e.g., bones, muscles, etc.) from the different scans is accurately positioned relative to the 3D model or image of the subject outer layer. To simplify the scan alignment or synchronization, the scans may be generated with the subject in the same position or pose and with the imaging or scanning equipment at the same position relative to the subject. Alternatively, 3D animation system 100 may rotate, resize, or otherwise transform the different scans so that they represent the subject at a common size, distance, orientation, and/or position.

3D animation system 100 uses the aligned or synchronized scans to automatically rig a 3D model of the subject for animation. Specifically, the aligned or synchronized scans provide exact and realistic positioning, sizing, orientation, and/or other placement for the actual bones and the actual muscles of the subject that are used to rig the 3D model for animation as opposed to artificially or manually defining and placing bones and joints for animation as is done with current animation techniques.

Figure 2:
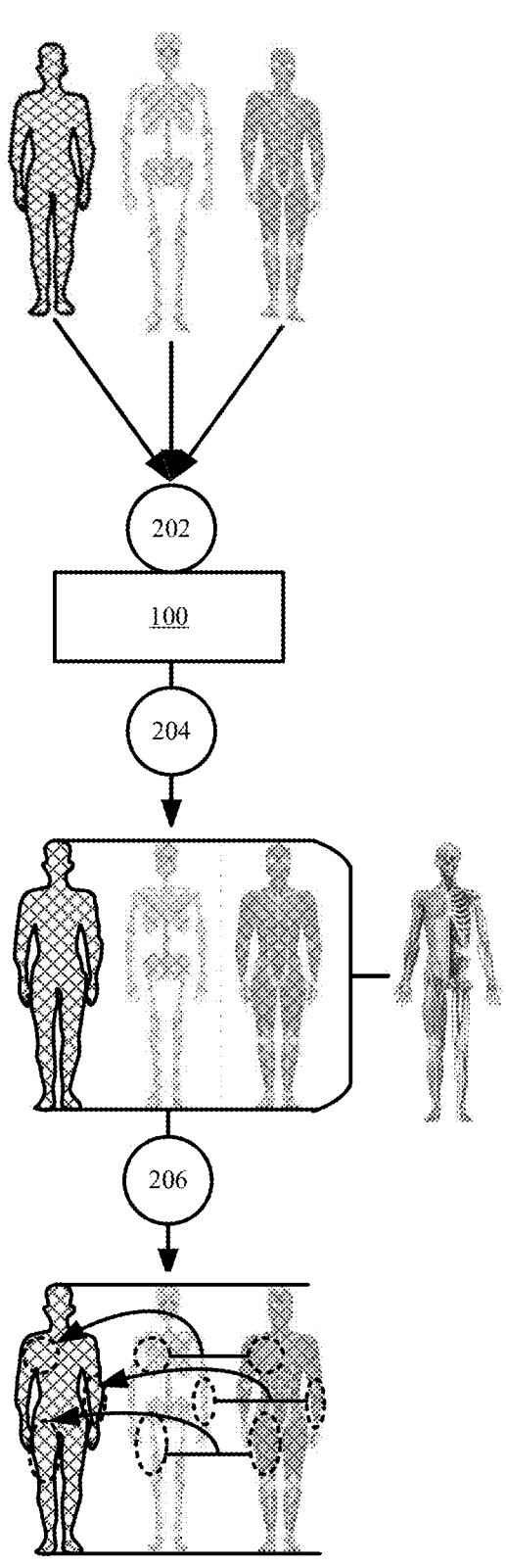
FIG. 2 illustrates an example of automatically rigging a 3D model of a subject based on the different scans that are obtained for the subject in accordance with some embodiments presented herein.

FIG. 2 illustrates an example of automatically rigging a 3D model of a subject based on the different scans that are obtained for the subject in accordance with some embodiments presented herein. 3D animation system 100 receives (at 202) the different scans of the subject or the scans in a 3D format that may be manipulated or processed by 3D animation system 100.

The different scans include a 3D model for the outer layer or surface of the subject. In some embodiments, the 3D model is defined as a point cloud, mesh model, or other 3D format. For instance, a point cloud representation of the 3D model uses points that are distributed across a 3D space to accurately create the 3D shape and form for the outer layers or exposed surfaces of the subject. A mesh model representation of the 3D model uses polygons or meshes that are connected about common vertices to create the 3D shape and form of the subject. The 3D model may be generated directly from the output of an imaging device. For instance, a LiDAR scanner may measure the positions of different points across the outer surface of the subject and may define the point cloud points based on the measured points. Alternatively, the outer surfaces of the subject may be captured in different images, and a photogrammetry technique may be used to construct the 3D shape and form of the subject based on the appearance and/or deviation of overlapping portions in the different images.

The different scans also include inner structures of the subject that control physical movement of the subject. Specifically, the different scans may provide a musculoskeletal representation of the subject with one scan presenting the subject's skeletal system (e.g., size, positioning, form, orientation, and/or other placement of the subject bones) and another scan presenting the subject's muscular system (e.g., size, positioning, form, orientation, and/or other placement of the subject muscles).

3D animation system 100 aligns (at 204) the scans so that the musculoskeletal representation is accurately overlaid or inset within the 3D model. In some embodiments, 3D animation system 100 applies one or more transformations to one or more of the different scans in order to size, orient, and position the scans to present the structures at correct sizes, orientations, and positions relative to the 3D model or in relation to the subject. In other words, aligning (at 204) the scans includes adjusting and arranging the scans to present the subject's outer layer and captured inner structures (e.g., musculoskeletal system) at correct and precise locations relative to the actual subject that is represented by those scans.

3D animation system 100 rigs (at 206) the 3D model of the subject based on the aligned (at 204) scans of the subject's musculoskeletal system. The rigging (at 206) includes defining a musculoskeletal animation framework and linking the musculoskeletal animation framework to the primitives of the 3D model so that the primitives are animated, moved, or adjusted according to movements of the musculoskeletal animation framework.

In some embodiments, defining the musculoskeletal animation framework includes defining virtual muscles and virtual bones according to the size, shape, orientation, and/or other characteristics of the inner structures detected in the scans and placing the virtual muscles and virtual bones relative to the primitives (e.g., points, meshes, polygons, etc.) of the 3D model based on the scan alignment (at 204). In some embodiments, 3D animation system 100 analyzes a first scan of the subject's skeletal system (e.g., an x-ray) to detect the position, size, form, and other characteristics of the subject's bones, and defines virtual bones of the musculoskeletal animation framework to match the detected characteristics of the subject's bones. Similarly, 3D animation system 100 analyzes a second scan of the subject's muscular system (e.g., ultrasound imaging) to detect the position, size, form, and other characteristics of the subject's muscles, and defines virtual muscles of the musculoskeletal animation framework to match the detected characteristics of the subject's muscles. Defining the musculoskeletal animation framework may further include attaching the virtual muscles to exact and correct positions on the virtual bones based on the alignment (at 204) of the scans and the resulting muscle and bone positions. In other words, 3D animation system 100 establishes the connectivity between the virtual muscles and the virtual bones to replicate the connectivity in the aligned (at 204) scans so that contractions of the virtual muscles move the virtual bones in the same manner as contractions of the actual muscle move the actual bones of the subject. In some embodiments, 3D animation system 100 performs a topographical mapping of the outer layer or surface scan to the inner layer or inner structure scans.

Once the musculoskeletal animation framework is defined, 3D animation system 100 may link the virtual muscles and virtual bones to different primitives of the 3D model in order to control the movement of the primitives based on the simulated realistic contractions of the virtual muscles, the effect that the contractions have on the connected virtual bones, and the combined effect that the virtual muscle contractions and virtual bone movements have on the linked primitives. Linking the musculoskeletal animation framework to the 3D model may include detecting a set of primitives that represent an outer surface or layer of the subject in the 3D model, determining the virtual muscle and/or the virtual bone defined in the musculoskeletal animation framework that is closest to that set of primitives, and establishing connectivity or linkage between the set of primitives and the closest virtual muscle and/or virtual bone so that the set of primitives are animated according to movements defined for the closest virtual muscle and/or virtual bone.

The automatic rigging of the 3D model by 3D animation system 100 saves artists, animators, and/or other users from the time-consuming task of manually defining the virtual bones and virtual muscles and then connecting the virtual bones and virtual muscles to the 3D model that is to be animated. Moreover, the automatic rigging generates an accurate and realistic musculoskeletal animation framework for precise and realistic animation of the subject, whereas the virtual bones and virtual muscles of a manually defined musculoskeletal animation framework may lose the precision and realism as a result of being created with a size, form, orientation, positioning, and/or other characteristics that differ from the subject's actual bones and muscles.

Once the relationships between the musculoskeletal animation framework and the 3D model are established through the automatic rigging, 3D animation system 100 may generate a realistic model for how contractions of the virtual muscles affect the connected virtual bones and how the movements of the virtual muscles and virtual bones affect the positioning of the primitives that are linked to those virtual muscles and/or virtual bones. In some embodiments, 3D animation system 100 uses AI/ML techniques to model the animations or movements that are created by different virtual muscle contractions.

The AI/ML techniques may analyze training data that represent, illustrate, and/or capture sample movements of the subject that is the source of the musculoskeletal animation framework or a related subject. The training data may include videos or animations that show the outer layers or surfaces of the subject or a related subject in motion with sufficient resolution or detail to also illustrate the affects that muscles movements or contractions have on the outer layers or surfaces. The training data may also include or may be accompanied with electrocardiogram (EKG), electromyography (EMG), and/or other data for activity of different muscles. The training data may further include thermal imaging or infrared captures of the subject. The thermal imaging or infrared captures may supplement the training videos, EKG, or EMG data to verify false positives or otherwise provide additional granularity as to which muscles are activated for different motions represented in the training data.

FIG. 3 presents a process 300 for training an animation model for the musculoskeletal animation framework to replicate realistic motion in accordance with some embodiments presented herein. Process 300 is implemented by 3D animation system 100. 3D animation system 100 includes one or more devices or machines with processor, memory, storage, network, and/or other hardware resources for creating realistic 3D animations for movies, games, spatial computing experiences, and/or other computer graphics use cases.

Process 300 includes receiving (at 302) the musculoskeletal animation framework that is created for a particular subject and a 3D model of the particular subject. In some embodiments, 3D animation system 100 generates the musculoskeletal animation framework based on the different body scans that different imaging or scanning equipment produce for different layers or structures of the subject. In some embodiments, 3D animation system 100 also generates the 3D model of the particular subject from one or more of the different body scans. The 3D model represents the outer shape and form of the subject, and may be encoded as a point cloud, mesh model, or other 3D format. Accordingly, the primitives forming the 3D model may include points, meshes, polygons, or other shapes from which to construct a 3D form. The musculoskeletal animation framework is defined relative to the 3D model. The elements of the musculoskeletal animation framework, including the virtual muscles and virtual bones, are sized, positioned, and oriented according to a particular size, positioning, and orientation of the 3D model.

Process 300 includes receiving (at 304) training data for movements or motions that the particular subject is capable of performing. In some embodiments, the training data includes videos or animations that illustrate one or more sample movements or motions to be recreated by the 3D model of the particular subject. The training data may be of the particular subject or related subjects performing the sample movements or motions. For instance, the particular subject may be a first type of bird and the training data may illustrate other types of bird flapping their wings during flight. In some other embodiments, the training data illustrates a full range of motion for the particular subject limbs or moveable elements rather than a particular movement that is to be recreated. For instance, the training data may capture the particular subject opening and closing all fingers on their hands to illustrate the full range of motion associated with each finger. From the full range of motion, any realistic movement of those same fingers may be recreated. For instance, the animation for generating a peace sign (e.g., index and middle finger extended and all other fingers closed) may be modeled or created.

Process 300 includes defining an animation model for the musculoskeletal animation framework elements based on the sample movements or motions in the training data. The animation model may be defined using one or more AI/ML techniques or neural networks. The AI/ML techniques or neural networks use the training data to determine simulated muscle contractions that are associated with or that produce different limb, body part, or structural movements.

To define the animation model, process 300 includes mapping (at 306) the musculoskeletal animation framework elements to different parts of the animated subject in the training data and retaining the mapping throughout the animation, sample motion, or sample movement of the training data. For instance, the AI/ML techniques or neural networks detect virtual muscles and virtual bones that are of a corresponding size and shape and at a relative position to a corresponding limb or body part of the animated subject in the training data. Continuing with the bird flight example, the musculoskeletal animation framework may include different sets of muscles and connected bones in the arced shape of left and right wings, and may map those different sets of muscles and connected bones to the wings of a flying bird captured in the training data. The mapping (at 306) may include adjusting the size, orientation, and other characteristics of the musculoskeletal animation framework elements so that they aligned with the corresponding limb or body part in the training data.

Process 300 includes analyzing (at 308) the movements or motions at every part of the animation subject in the training data that is mapped to an element of the musculoskeletal animation framework. The analysis (at 308) involves tracking the movement or motion at the corresponding part as well as the fine details associated with the movement or motion. The fine details include contour changes occurring about the outer layers or surfaces, stretching or compression of the outer layers or surfaces, and/or other changes occurring to the outer layers or surfaces as part of a tracked movement or motion due to muscle contractions and bone movements under the outer layers or surfaces. For instance, the training data may present a human subject running. The analysis (at 308) includes tracking the forward, backward, up, and down movements of the subject's legs and also the curvature or contour changes occurring to the thigh portion of the legs as a result of the quadricep muscles contracting and expanding during the tracked leg motion, the curvature or contour changes occurring to the back portion of the upper legs as a result of the gluteus and back leg muscles contracting and expanding during the tracked leg motion, the curvature or contour changes occurring to the lower legs as a result of the calf muscles contracting and expanding during the tracked leg motion, etc.

Process 300 includes modeling (at 310) different simulated contractions of a virtual muscle that is mapped (at 306) to a particular animated part in the training data, and determining (at 312) a particular simulated contraction or sequential set of simulated contractions of the virtual muscle that mirror or recreate the analyzed (at 308) movements or motions for that particular animated part. Modeling (at 310) the different simulated contractions may include changing the length and shape of the virtual muscle by different amounts, and determining the effect that the changing length and shape has on any connected virtual bones. For instance, a first simulated contraction may include shortening and extending the virtual muscle without changing the curvature of the virtual muscle, a second simulated contraction may include shortening the virtual muscle with an increasing concave shape at the distal end or middle of the virtual muscle and extending the virtual muscle in a manner that reduces the concave shape until the virtual muscle is flat at the end of the extension, and a third simulated contraction may include widening the virtual muscle as it is contracted or shortened and reducing the width of the virtual muscle as it is extended. In some embodiments, the different contractions are defined as functions that perform different shape modifications to a virtual muscle definition in the musculoskeletal animation framework. Accordingly, each function may simulate a different modeled muscular contraction or movement, and the different functions may be applied to a selected virtual muscle to determine which function most accurately or precisely recreates the motion or changing shape for the mapped part of the animated subject in the training data.

Process 300 includes associating (at 314) the particular simulated contraction or the sequential set of simulated contractions to the virtual muscle in the animation model in response to determining that the particular simulated contraction or sequential set of simulated contractions recreates the analyzed (at 308) movements or motions for the particular animated part of the animated subject that is mapped (at 306) to that virtual muscle. In some embodiments, a motion identifier or classification label is associated with the particular simulated contraction or the sequential set of simulated contractions to indicate the motion that is represented by the associated (at 314) simulated contractions. In some other embodiments, a virtual muscle has a uniform expansion and contraction, and the amount of expansion or contraction along with other virtual muscles produce different movements. Accordingly, the animation model may store a single simulated contraction for a virtual muscle to model that virtual muscle's range of motion. For instance, the quadriceps muscles perform a similar contraction when a human is running or squatting with the difference in motion resulting from when the muscle contractions occurs, the amount of contraction, and other muscles contracting at the same time. Associating (at 314) the particular simulated muscle contraction therefore includes defining the movement and range of motion for the particular virtual muscle and how the shape or form of the particular virtual muscle across that movement and range of motion.

Figure 4:
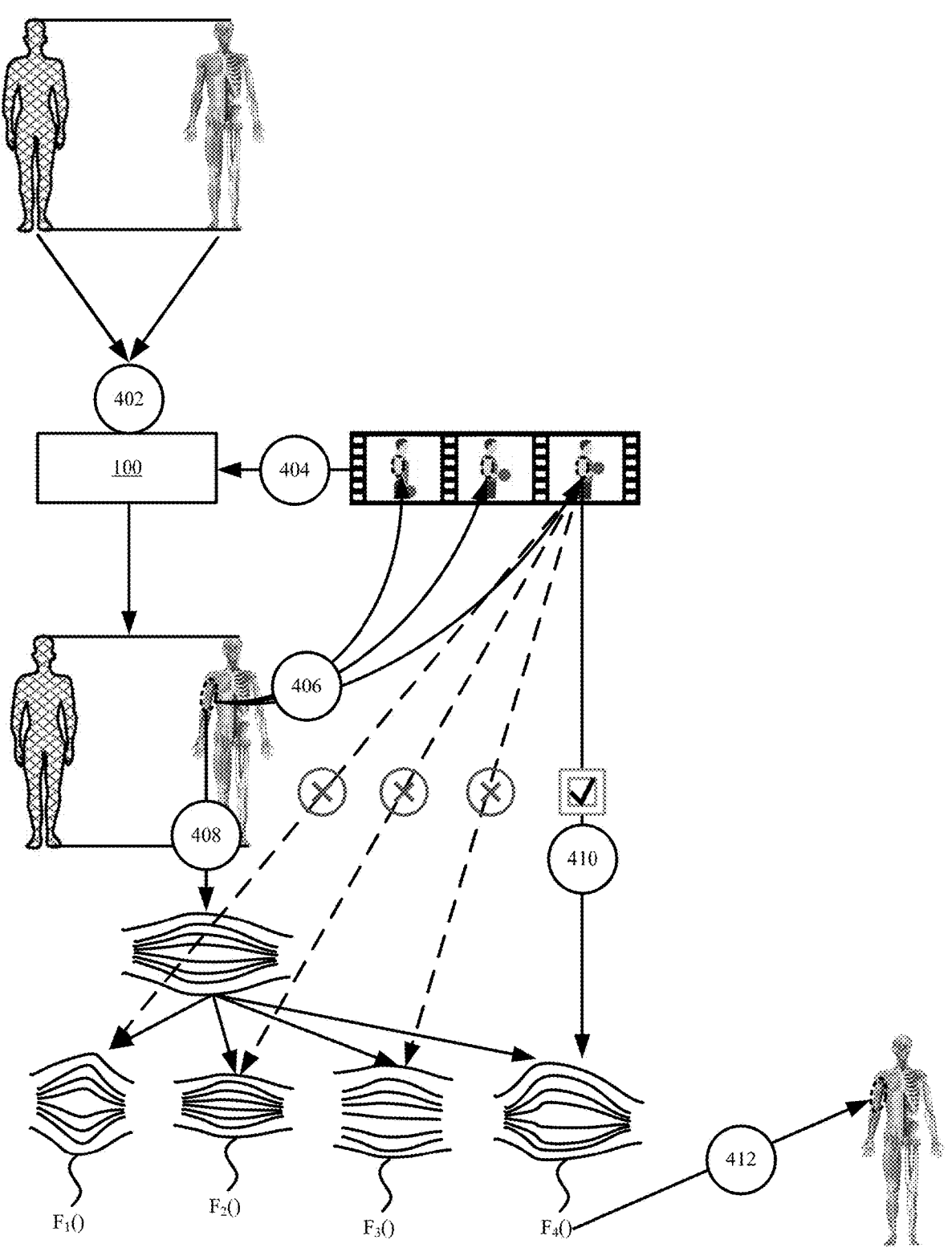
FIG. 4 illustrates an example of training the musculoskeletal animation framework to realistically recreate the motion of a particular body part based on motion captured in a training video in accordance with some embodiments presented herein.

FIG. 4 illustrates an example of training the musculoskeletal animation framework to realistically recreate the motion of a particular body part based on motion captured in a training video in accordance with some embodiments presented herein. 3D animation system 100 receives (at 402) a generated 3D model and aligned musculoskeletal animation framework for a humanoid subject. 3D animation system 100 also receives (at 404) a training video that depicts a different animated subject raising their forearm via a bicep contraction.

3D animation system 100 maps (at 406) the musculoskeletal animation framework elements to the animated subject in the training video such that the virtual muscle representing the bicep in the musculoskeletal animation framework is aligned with the upper arm of the animated subject. The mapping (at 406) includes identifying body parts or features in the training video that have a similar size and shape and that are at a similar relative position as one or more virtual muscles, and associating the identified body parts or features to the one or more virtual muscles with a related size and shape and a similar relative position. 3D animation system 100 retains the mapping (at 406) and tracks the change in the upper arm shape as the animated subject raises their forearm.

3D animation system 100 applies (at 408) different muscle contraction functions to the virtual muscle, compares the changes to the virtual muscle after applying each muscle contraction functions to the tracked change in the upper arm shape in the training video, and selects (at 410) the muscle contraction function that mirrors or produces the same change in the virtual muscle shape, form, and/or position as tracked for the upper arm of the animated subject in the training video. Each muscle contraction function specifies a different transformation for adjusting the positioning of the primitives that represent the virtual muscle in the musculo-skeletal animation framework. In some embodiments, the muscle contraction functions are defined or modeled to simulate movements of common or prominent muscles in a variety of species. In some embodiments, selecting (at 410) the muscle contraction function includes tuning parameters of the selected muscle contraction function to improve conformance with or more closely mirror the changing shape of the upper arm in the training video.

3D animation system 100 updates (at 412) the animation model for the musculoskeletal animation framework so that the virtual muscle is animated using the selected (at 410) muscle contraction function. In some embodiments, the training video or the captured motion of the animated subject raising their forearm may be used to define the motion for multiple virtual muscles, bones, or elements of the musculoskeletal animation framework. For instance, mapping (at 406) the musculoskeletal animation framework elements to the animated subject in the training video may also include mapping the virtual muscle representing the tricep in the musculoskeletal animation framework to the part of the animated subject's upper arm that is below the bicep and the humerus and mapping the virtual bone repre-senting the humerus to the middle section of the animated subject's upper arm. 3D animation system 100 may then selects a muscle contraction function that changes the tricep virtual muscle shape to mirror the changing shape of the tricep in the training video of the animated subject raising their forearm.

The resulting animation model may be used to realisti-cally animate a 3D model by defining the animation through the simulated muscle contractions that are defined for each virtual muscle of the musculoskeletal animation framework that is defined for that 3D model. The simulated muscle contractions realistically modify the shape and position of the virtual muscles which, in turn, causes a realistically movement of the virtual bones that are connected to those virtual muscles. The movements of the virtual muscles and the virtual bones are translated to adjustments or animations of the 3D model, wherein the primitives of the 3D model are modified according to the animations of the virtual muscles and virtual bones that are connected to, nearest to, or associated with those primitives.

Figure 5:
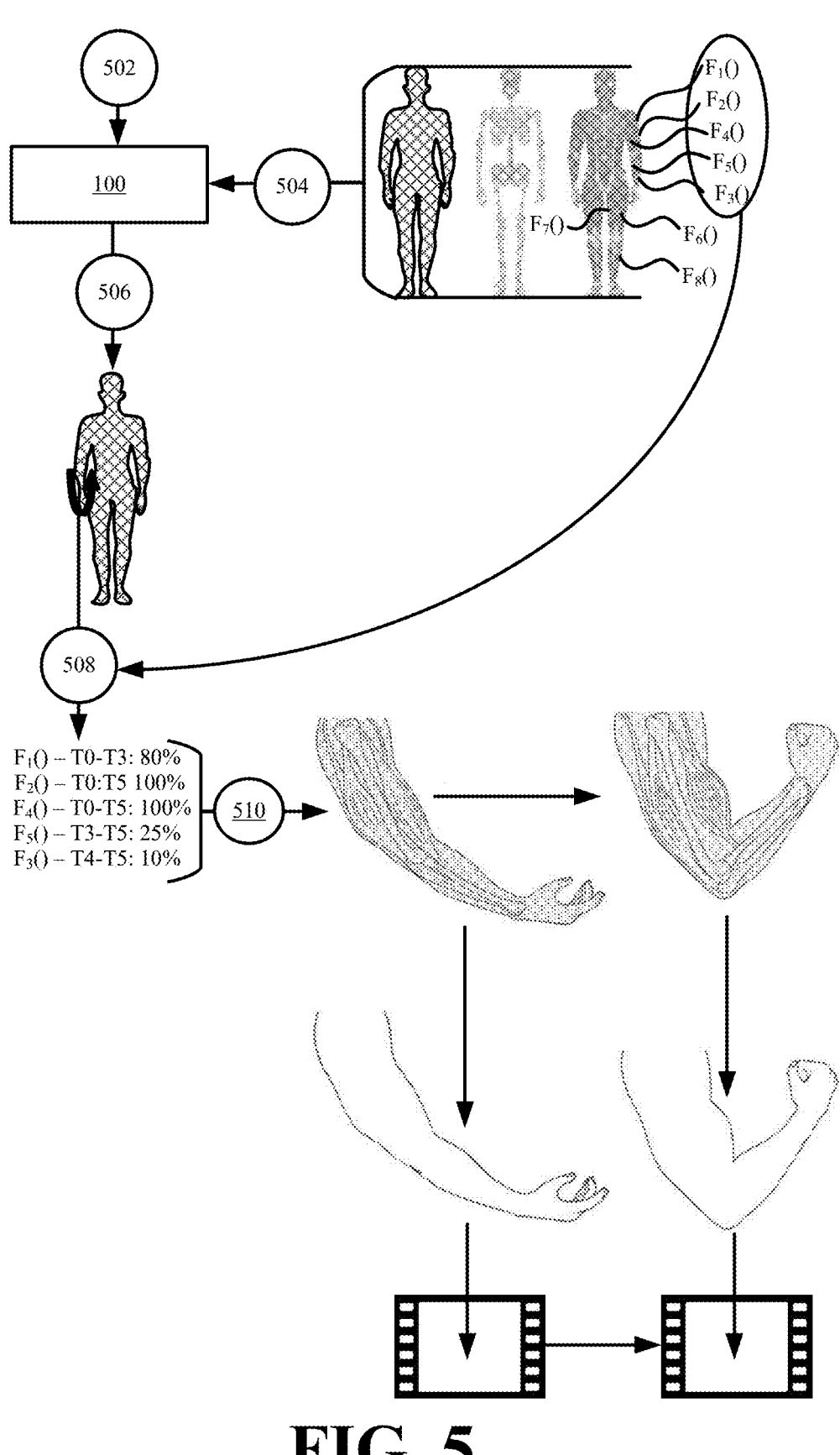
FIG. 5 illustrates an example of animating a 3D model based on the animation model that is created for the musculoskeletal animation framework of that 3D model in accordance with some embodiments presented herein.

FIG. 5 illustrates an example of animating a 3D model based on the animation model that is created for the mus-culoskeletal animation framework of that 3D model in accordance with some embodiments presented herein. 3D animation system 100 receives (at 502) a request to animate a 3D model. In some embodiments, the 3D model is gen-erated from static or stationary scans of a particular subject. In some other embodiments, the 3D model is a digitally created character or object for which there is no real-world equivalent.

3D animation system 100 retrieves (at 504) the 3D model, the musculoskeletal animation framework that is aligned with that 3D model, and the animation model that is created for that musculoskeletal animation framework. If the 3D model is a representation of a living or real-world subject, then the musculoskeletal animation framework may be generated from scans obtained of that subject. If the 3D model is digitally created, then 3D animation system 100 may obtain a musculoskeletal animation framework for a related subject. For instance, the 3D model may be a digitally created alien with a human form. 3D animation system 100 may retrieve (at 504) the musculoskeletal ani-mation framework that was generated from scanning human form on which the 3D model is loosely based or similar to.

3D animation system 100 receives (at 506) user input for a desired animation. For instance, the user input may include selecting a part of the 3D model (e.g., a character limb or other body part) and specifying an end position for that part. Alternatively, the user input may include selecting an action from a list of actions (e.g., run, jump, crouch, punch, kick, turn, etc.) and applying the action to a part of the 3D model or the entire 3D model.

3D animation system 100 calculates (at 508) the virtual muscle contractions that reposition the bones of the muscu-loskeletal animation framework to produce the desired ani-mation or end position or posture for the 3D model. More specifically, 3D animation system 100 determines the virtual muscles from the musculoskeletal animation framework that are involved in the desired animation based on a mapping between the selected part of the 3D model and the virtual muscles of the musculoskeletal animation framework, and calculates (at 508) contractions of the determined virtual muscles to animate the selected part as specified by the user input. Calculating (at 508) the contractions may include defining a time-sequenced execution of muscle contraction functions with different parameters on different determined virtual muscles that exactly recreate the motion specified by the user input or that recreate realistic motion to arrive at the final position that is specified by the user input.

In some embodiments, 3D animation system 100 calcu-lates (at 508) the virtual muscle contractions in real-time using the associated functions of the animation model to track the adjustments that the user makes to the 3D model via the user input. Specifically, 3D animation system 100 computes the contractions that mirror the displacement of the selected part as that selected part is moved by the user input. In some embodiments, 3D animation system 100 calculates (at 508) the virtual muscle contractions to move a selected part from a starting position to an ending position after the movement has been defined by the user input.

3D animation system 100 renders (at 510) changes to the 3D model primitives based on the calculated (at 508) virtual muscle contractions. Rendering (at 510) the changes includes adjusting the positioning, size, orientation, and other visual characteristics of the 3D model primitives to present the animation or movement that is specified by the user input and the details resulting from the effects that muscle contractions and bone movements have on the outer layer of the 3D model that is represented by the 3D model primitives. In other words, the 3D model primitives not only move in the direction of the specified animation, the 3D model primitives also change shape and form to present the additional realistic detail that muscle contractions have on the epidermal or outer layer of the 3D model.

In some embodiments, rendering (at 510) the changes to the 3D model primitives is a two-step procedure. 3D ani-mation system 100 may first render the modified positions for the elements of the musculoskeletal animation frame-work that are affected by the calculated (at 508) virtual muscle contraction at each frame of the animation. 3D animation system 100 then modifies the positioning of the 3D model primitives at each frame of the animation based on the modified positions of the musculoskeletal animation framework elements, and presents or generates a visualiza-tion based on the modified positioning of the 3D model primitives with the modified positions of the musculoskeletal animation framework elements not shown in the animation.

The animations generated by 3D animation system 100 contain significantly more detail, are much more realistic, and visually accurate than animations generated through motion capture techniques or other animation techniques. This is because 3D animation system 100 generates the 3D model animations from the modeled muscle contractions. Consequently, the effects of the muscle contractions on the outer layers or surfaces of the 3D model become visually apparent and provide additional definition and realism in the rendered outer layers or surfaces of the 3D model. Other animation systems do not consider or render the effects that muscle contractions have on the 3D model or perform a reverse modeling of the muscle contractions that are later added on after the specified 3D model movements and adjustments have already been defined.

3D animation system 100 may be used to create digital characters that mirror actual motions of real-world equivalents. For instance, 3D animation system 100 may accurately recreate mannerisms and movements of professional athletes in their video game representative characters. Similarly, digitally created animals for movies may be presented with realistic musculoskeletal movement that is trained from videos of the real-world animal movements.

3D animation system 100 may further improve the realism by separately defining different animation models for different animations rather than define a single animation model for all animation of a particular subject. For instance, 3D animation system 100 may receive a 3D model of a lion, may train a first animation model based on videos of lions running and hunting, and may train a second animation model based on videos of lions walking and resting. The different animations may be separately classified because the muscle contractions associated with running and hunting are exaggerated relative to the muscle contractions associated with walking and resting. Accordingly, 3D animation system 100 may define multiple animation models for a particular subject and may use each animation model to generate a different animation of the 3D model of the particular subject.

Alternatively, a single animation model that captures the full range of motion for each of the modeled virtual muscles may be sufficient to accurately and realistically replicate motion of a represented 3D model. In generating an animation, 3D animation system 100 may condition the amount of the virtual muscle contractions to produce more or less exaggerated contractions, and thereby realistically differentiate contractions associated with running and hunting from contractions associated with walking and resting.

In some embodiments, the musculoskeletal animation framework and the associated animation models may be used to improve the realism of animations that are defined through other means. For instance, motion capture technology may be used to animate a digital character. However, the motion capture technology tracks motion or movements at specific points about an actor's body and translates the tracked motion or movements to corresponding points of the digital character or points about a skeletal framework defined for the digital character. Consequently, the motion captured animation does not capture the detail or definition associated with muscle contractions occurring at other points of the actor's body that are not tracked. 3D animation system 100 enhances the animation to include the effects of the muscle contractions for all frames of the motion captured 3D model animation.

FIG. 6 presents a process 600 for enhancing an animation using the musculoskeletal animation framework and an associated animation model in accordance with some embodiments presented herein. Process 600 is implemented by 3D animation system 100.

Process 600 includes receiving (at 602) a 3D model animation with a request to increase the definition, realism, or accuracy of the 3D model animation. The 3D model animation was not created using the musculoskeletal animation framework and the associated animation model. Instead, the 3D model animation may be generated using motion capture technology or by manually defining movements for different parts of the 3D model or for a skeletal framework of the 3D model that is manually created or defined without any of the virtual muscles of the musculoskeletal animation framework. In any case, the 3D model animation specifies changes to apply to different sets of primitives (e.g., meshes, points, etc.) of a 3D model at different times or frames of the animation.

Process 600 includes retrieving (at 604) the musculoskeletal animation framework and the animation model that is associated with the 3D model. For instance, the 3D model may be generated from scanning the outer layers or surfaces of a particular subject. The 3D model may be animated using motion capture techniques. At the same time or at different times, the musculoskeletal system of the particular subject may have also been scanned and the scan results may be used to generate the musculoskeletal animation framework. The animation model may be created after the musculoskeletal animation framework is generated by providing the musculoskeletal animation framework and training data for the particular subject as inputs to the AI/ML techniques or neural networks. The AI/ML techniques or neural networks reference and/or analyze the training data to simulate contractions or movements for the musculoskeletal animation framework elements that recreate the same movements from the training data. The animation model may be integrated as part of the musculoskeletal animation framework by associating the muscle contraction functions to the virtual muscles whose movements or animations are controlled by those functions.

Process 600 includes replicating (at 606) the 3D model animation through simulated muscle contractions of the musculoskeletal animation framework elements. Replicating (at 606) the 3D model animation may include adjusting the musculoskeletal animation framework elements based on the associated virtual muscle contractions and/or animations so that the shape and/or positioning of the elements conform to the shape and/or positioning of corresponding parts of the 3D model as presented in a first frame or starting frame of the 3D model animation and in subsequent frames. Specifically, 3D animation system 100 determines which elements map to which parts of the 3D model, adjusts the shape and position of the elements with the associated muscle contract functions of the animation model so that the elements approximately match the shape and position of the mapped parts, and continues adjusting the elements with the associated muscle contract functions to track the movement of those parts in the 3D model animation.

Process 600 includes adding (at 608) definition or detail to the 3D model animation based on differences in the positioning of the 3D model primitives at each frame of the animation and the positioning of the musculoskeletal animation framework elements that are mapped to those primitives at the corresponding frames in the animation. In other words, the 3D model primitives are adjusted from their original positions in the animation to match and follow the changing contours and shapes of the contracting virtual muscles from the musculoskeletal animation framework that are mapped to or otherwise affect the positioning of those 3D model primitives.

In some embodiments, 3D animation system 100 adds (at 608) the definition or detail by redefining the 3D model animation. In some such embodiments, 3D animation system 100 renders the 3D model primitives based on the simulated muscle contractions that replicate the original 3D model animation. Specifically, 3D animation system 100 adjusts the positioning, size, orientation, and other visual characteristics of the 3D model primitives based on the effects that the simulated muscle contractions have on the outer layer of the 3D model. This may be two-stage rendering process in which 3D animation system 100 renders the modified positions for the elements of the musculoskeletal animation framework that are affected by the simulated virtual muscle contractions at each frame of the animation, modifies the positioning of the 3D model primitives at each frame of the animation based on the modified positions of the musculoskeletal animation framework elements, and presents or generates a visualization based on the modified positioning of the 3D model primitives with the modified positions of the musculoskeletal animation framework elements not shown in the animation.

In some embodiments, the training data may include videos or animations that illustrate musculoskeletal degradation or improvement. In some such embodiments, 3D animation system 100 may use the training for medical diagnostic modeling to identify causes of injury (e.g., musculoskeletal motions that caused bone fractures, muscle tears, ligament damage, etc.) and/or to model recovery of the musculoskeletal system after injury, exercise, and/or other movements represented in the training data.

For instance, the training data may include a video of an athlete performing some movement or action that resulted in a specific injury (e.g., bone fracture, muscle tear, etc.). In generating the animation model, 3D animation system 100 may enter the training data with an identification of the specific injury about the musculoskeletal animation framework, and the AI/ML techniques may determine a sequence of virtual muscle contractions and virtual bone movements based on a mapping of the athlete's body in the video to the musculoskeletal framework and an analysis of the movements that are depicted in the video. Multiple videos of body movements immediately preceding the specific injury may improve the accuracy of the animation model and/or determining the exact sequence or primary virtual muscle contractions and/or virtual bone movements that contribute to the specific injury. The animation model may be compared to movements of other athletes to quantify a risk of the other athletes experiencing the same injury or to instruct the other athletes in changes that may reduce their risk of sustaining the specific injury.

Additionally, the animation models may be used to diagnose injuries or medical conditions. For instance, the training data may include scans or videos that show the body or musculoskeletal system of one or more individuals before and after a particular injury. 3D animation system 100 and/or the AI/ML techniques may generate animation models for the musculoskeletal framework that mirror or recreate the changes that the body or musculoskeletal system experiences before and after the particular injury. Scans of a patient with an undiagnosed injury or medical condition may then be compared to the animation models with degradation of specific muscles or changes to specific bones of the patient being mapped to the same muscle degradation and/or bone changes modeled for the particular injury.

Similarly, the animation models may be used to model recovery after an injury. For instance, an injury may affect a specific muscle group causing that specific muscle group to lose strength, deteriorate, degrade, or otherwise change. 3D animation system 100 may receive training data of different users performing different movements or exercises over time as well as scans of the different users' bodies over time to determine which muscles or muscle groups are affected by the different movements or exercises. 3D animation system 100 may also receive scans of a particular individual that has suffered a particular injury or that is ready to rehabilitate after the particular injury. 3D animation system 100 may detect which muscle group was affected by the particular injury, and may generate an exercise regimen for the movements or exercises that specifically target the affected muscle group. In other words, 3D animation system 100 customizes the suggested movements or exercises based on exact physiological changes to the individual's musculoskeletal system rather than suggest the same movements or exercise for every individual experiencing the same injury or diagnosis.

3D animation system 100 may encode the 3D model, the musculoskeletal animation framework of the 3D model, and the animation model for the musculoskeletal animation framework in a single data structure, and may optimize the streaming of the data by selectively distributing data as required by a requesting device or system. For instance, a graphic designer may issue a request to edit the 3D model. In response to the request, 3D animation system 100 provides the 3D model primitives that are stored in the data structure and retains the data for the musculoskeletal animation framework and the animation model. A medical practitioner may wish to diagnose an injury to a person. In this case, 3D animation system 100 may provide the medical practitioner with the data for the virtual bones from the musculoskeletal animation framework if the injury is suspected to be a fractured bone, the data for the virtual muscles if the injury is suspected to be a soft tissue injury, or all the data of the musculoskeletal animation framework if the injury is unknown. Similarly, 3D animation system 100 may selectively stream the data based on a level of detail that an artist desires for an animation.

Figure 7:
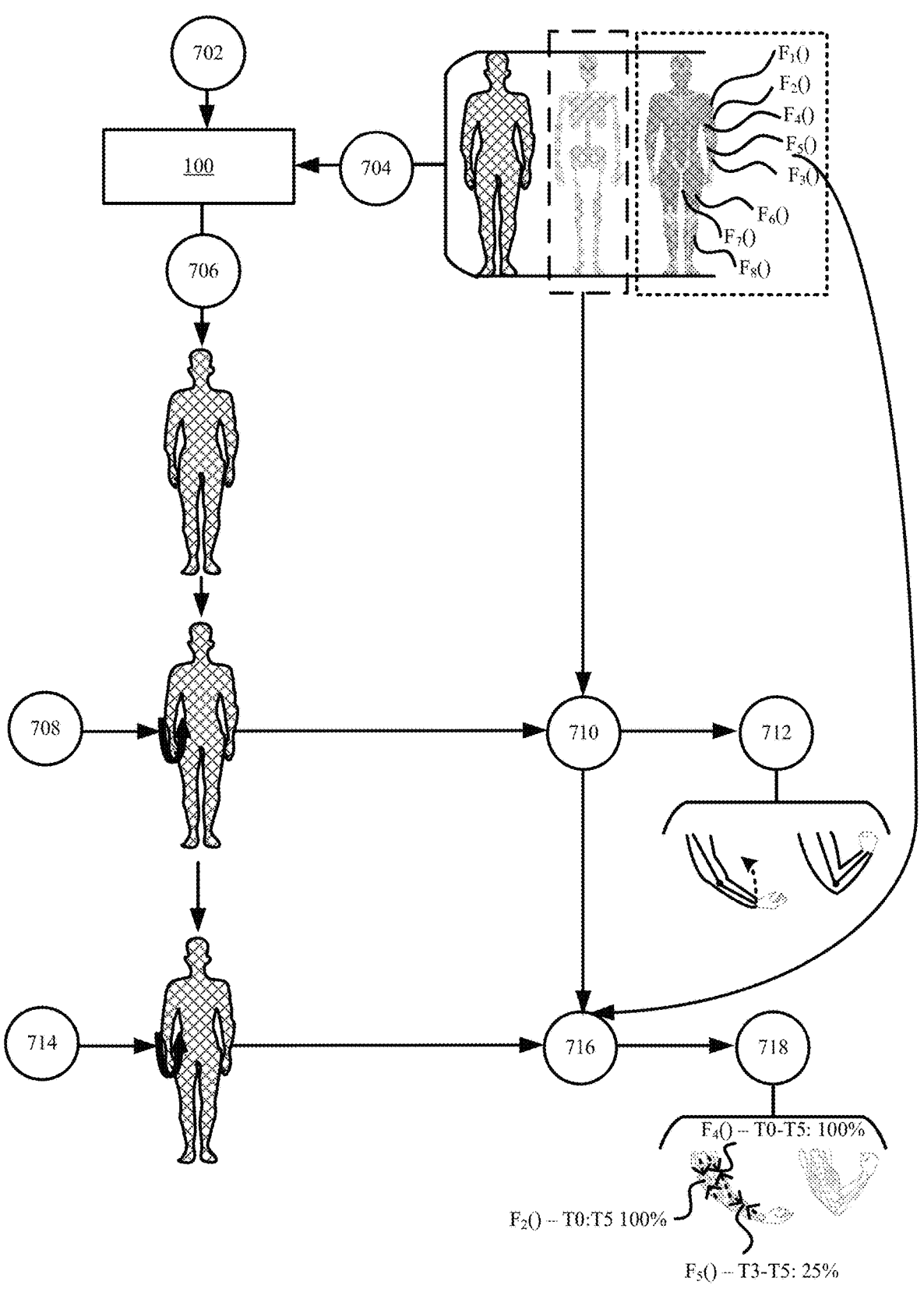
FIG. 7 illustrates an example of selectively streaming data for animating a 3D model in accordance with some embodiments presented herein.

FIG. 7 illustrates an example of selectively streaming data for animating a 3D model in accordance with some embodiments presented herein. 3D animation system 100 receives (at 702) a request to edit or view a 3D model.

3D animation system 100 retrieves (at 704) the data structure storing the 3D model, musculoskeletal animation framework of the 3D model, and the animation model for the musculoskeletal animation framework. In response to the request to edit or view the 3D model, 3D animation system 100 presents and/or distributes (at 706) the data for the 3D model to the requesting device without the data for the musculoskeletal animation framework and the animation model.

The user may view the 3D model from different perspectives and/or may edit the 3D model based on the provided data. For instance, editing the 3D model may include changing colors, adding new features, and/or otherwise manipulating the primitives for a static representation of the 3D model.

3D animation system 100 may receive (at 708) a request to animate the 3D model with a first level-of-detail. For instance, the user may wish to animate the 3D model and place the 3D model in the background of a 3D scene, the 3D model may be an ancillary or supporting character in the 3D scene, the 3D model may contain insufficient detail or be too small to resolve fine details, or the user may desire a cartoony, more rigid, or less detail animation.

In response to the request to animate the 3D model with the first level-of-detail, 3D animation system 100 presents and/or distributes (at 710) the data for the 3D model to the requesting device with a first set of data from the musculoskeletal animation framework that includes only the virtual bones or skeletal framework that are defined for the 3D model. 3D animation system 100 may generate (at 712) a first animation of the 3D model based on an articulation of the virtual bones and an effect that the articulation of the virtual bones has on the 3D model primitives. For instance, the animation may retain the spacing or distance between the 3D model primitives and the virtual bones as the virtual bones are moved. Accordingly, the animation model is not needed to generate (at 712) the first animation.

3D animation system 100 may receive (at 714) a request to animate the 3D model with a second level-of-detail that is greater than the first level-of-detail. For instance, the user may wish to animate the 3D model and place the 3D model in the foreground of the 3D scene, the 3D model may be a frontmost or prominent character in the 3D scene, the user may desire a realistic animation, or the device playing back the animation may have sufficient resources to support smooth playback with the second level-of-detail.

In response to the request to animate the 3D model with the second level-of-detail, 3D animation system 100 presents and/or distributes (at 716) the complete data structure (e.g., the 3D model, the musculoskeletal animation framework, and the animation model) to the requesting device. 3D animation system 100 may generate (at 718) a second animation of the 3D model by defining the animation through simulated muscle contractions of the animation model that are associated with different virtual muscles of the musculoskeletal animation framework, rendering the effects that the simulated muscle contractions have on the virtual muscles and connected virtual bones of the musculoskeletal animation framework, and translating the effects to the 3D model primitives that are linked to or are affected by the adjustments to the virtual muscles and connected virtual bones.

Figure 8:
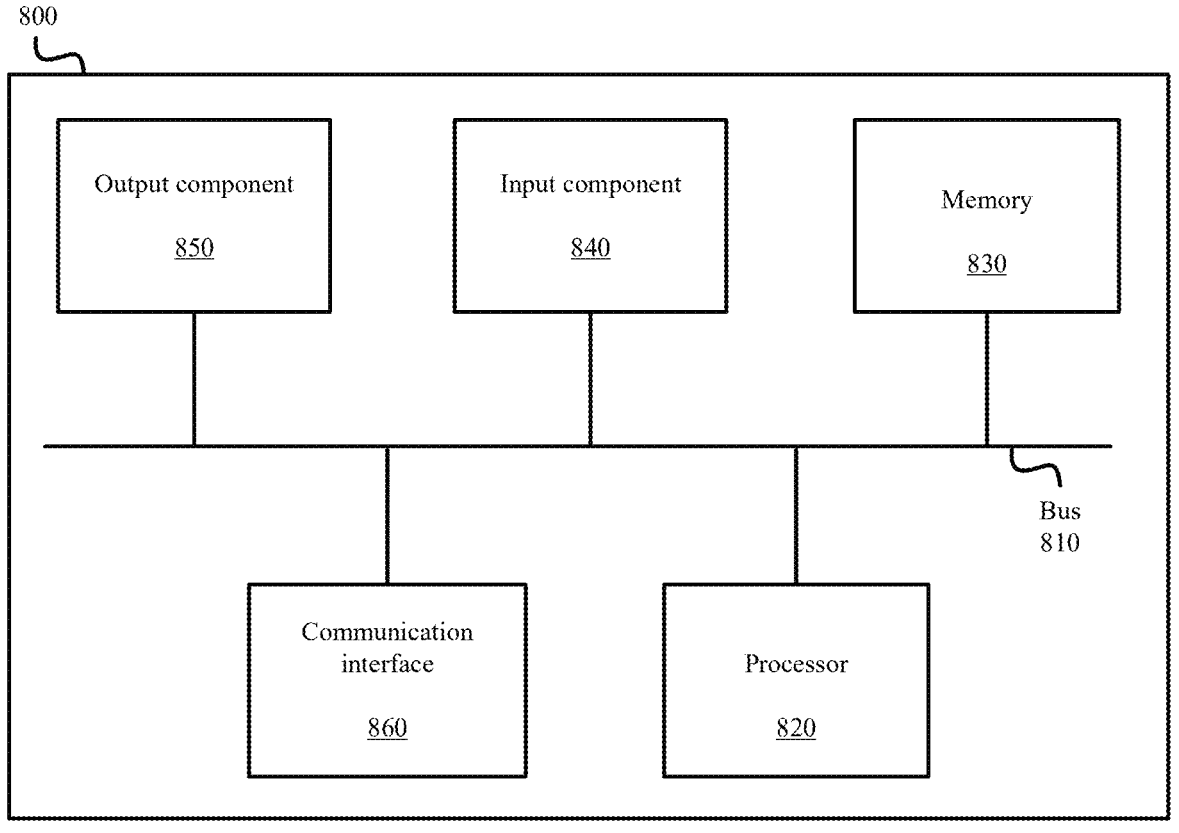
FIG. 8 illustrates example components of one or more devices, according to one or more embodiments described herein.

FIG. 8 is a diagram of example components of device 800. Device 800 may be used to implement one or more of the tools, devices, or systems described above (e.g., 3D animation system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below May directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
receiving a plurality of scans of a target subject;
generating a first plurality of primitives that form a three-dimensional (3D) model of the target subject based on a first scan of the plurality of scans;
defining a musculoskeletal framework comprising a second plurality of primitives that represent virtual muscles and virtual bones detected from other scans of the plurality of scans;
rigging the 3D model for animation based on an alignment of the second plurality of primitives of the musculoskeletal framework and the first plurality of primitives of the 3D model; and
animating the 3D model based on simulated contractions of one or more of the virtual muscles, wherein animating the 3D model comprises:
determining an association between primitives from the second plurality of primitives representing the one or more virtual muscles and aligned primitives of the first plurality of primitives; and
adjusting the aligned primitives according to a movement created from the simulated contractions of the one or more virtual muscles.

2. The method of claim 1 further comprising:
generating the virtual bones of the musculoskeletal framework based on scanned bones of the target subject captured in a second scan of the plurality of scans.

3. The method of claim 2, wherein generating the virtual bones comprises:
converting a scanned bone in the second scan to a subset of primitives in the second plurality of primitives that represent the scanned bone in the musculoskeletal framework at a size and position that matches a size and position of the scanned bone in the second scan.

4. The method of claim 2 further comprising:
generating the virtual muscles of the musculoskeletal framework based on imaged muscles of the target subject captured in a third scan of the plurality of scans.

5. The method of claim 4 further comprising:
connecting the virtual muscles to different points about the virtual bones based on an alignment of the scanned bones from the second scan with the imaged muscles from the third scan.

6. The method of claim 1, wherein defining the musculoskeletal framework comprises
converting x-ray data to a first set of points or meshes of a 3D format that correspond to a first set of primitives from the second plurality of primitives; and
converting ultrasound data to a second of points or meshes of the 3D format that correspond to a second set of primitives from the second plurality of primitives.

7. The method of claim 1 further comprising:
mapping the second plurality of primitives representing the virtual muscles and the virtual bones of the musculoskeletal framework to different sets of the first plurality of primitives of the 3D model based on alignment of the plurality of scans and a proximity between the different sets of primitives and primitives representing different virtual muscles of the musculoskeletal framework.

8. The method of claim 1 further comprising:
receiving training data showing movements of the target subject or a related subject;
mapping the virtual muscles and the virtual bones to different parts of the target subject or the related subject in the training data;
determining a simulated contraction of a particular virtual muscle that recreates a motion of a mapped part of the target subject or the related subject across the training data; and
associating the simulated contraction to the particular virtual muscle in an animation model of the musculoskeletal framework.

9. The method of claim 8, wherein determining the simulated contraction comprises:
animating the particular virtual muscle with a plurality of functions; and
selecting a particular function from the plurality of functions that animates the particular virtual muscle with the motion of the mapped part.

10. The method of claim 8, wherein animating the 3D model further comprises:
defining a movement of the particular virtual muscle that animates the primitives of the second plurality of primitives from a starting position to an end position;

adjusting a shape or form of the particular virtual muscle across the movement of the particular virtual muscle according to the simulated contraction; and wherein adjusting the aligned primitives comprises repositioning the aligned primitives to match the shape or form of the primitives of the second plurality of primitives across the movement of the particular virtual muscle.

11. The method of claim 1, wherein the first plurality of primitives correspond to points of a point cloud or meshes of a mesh model.

12. The method of claim 1, wherein adjusting the aligned primitives comprises:

applying the movement created from the simulated contractions of the one or more virtual muscles to the aligned primitives.

13. The method of claim 1, wherein adjusting the aligned primitives comprises:

determining that the aligned primitives represent an outer layer for a particular part of the 3D model and that the primitives from the second plurality of primitives represent an inner structure for the particular part of the 3D model; and repositioning the aligned primitives representing the outer layer to match a changing shape or form of the inner structure defined from the simulated contractions of the one or more virtual muscles.

14. The method of claim 1, wherein animating the 3D model further comprises:

rendering the first plurality of primitives with a positioning of the aligned primitives changing according to the movement created from the simulated contractions of the one or more virtual muscles and without a visualization of the one or more virtual muscles or the second plurality of primitives.

15. The method of claim 1 further comprising:

presenting an animation comprising a changing visualization of the first plurality of primitives with a positioning of the aligned primitives changing according to the movement created from the simulated contractions of the one or more virtual muscles, wherein the one or more virtual muscles and the second plurality of primitives are not rendered as part of the animation or the changing visualization.

16. A three-dimensional (3D) animation system comprising:

one or more hardware processors configured to:

receive a plurality of scans of a target subject;

generate a first plurality of primitives that form a 3D model of the target subject based on a first scan of the plurality of scans;

define a musculoskeletal framework comprising a second plurality of primitives that represent virtual muscles and virtual bones detected from other scans of the plurality of scans;

rig the 3D model for animation based on an alignment of the second plurality of primitives of the musculoskeletal framework and the first plurality of primitives of the 3D model; and animate the 3D model based on simulated contractions of one or more of the virtual muscles, wherein animating the 3D model comprises:

determining an association between primitives from the second plurality of primitives representing the one or more virtual muscles and aligned primitives of the first plurality of primitives; and adjusting the aligned primitives according to a movement created from the simulated contractions of the one or more virtual muscles.

17. The system of claim 16, wherein the one or more hardware processors are further configured to:

generate the virtual bones of the musculoskeletal framework based on scanned bones of the target subject captured in a second scan of the plurality of scans.

18. The system of claim 17, wherein generating the virtual bones comprises:

converting a scanned bone in the second scan to a subset of primitives in the second plurality of primitives that represent the scanned bone in the musculoskeletal framework at a size and position that matches a size and position of the scanned bone in the second scan.

19. The system of claim 17, wherein the one or more hardware processors are further configured to:

generate the virtual muscles of the musculoskeletal framework based on imaged muscles of the target subject captured in a third scan of the plurality of scans.

20. A non-transitory computer-readable medium storing instructions that, when executed by one or more processors of a three-dimensional (3D) animation system, cause the 3D animation system to perform operations comprising:

receiving a plurality of scans of a target subject;

generating a first plurality of primitives that form a 3D model of the target subject based on a first scan of the plurality of scans;

defining a musculoskeletal framework comprising a second plurality of primitives that represent virtual muscles and virtual bones detected from other scans of the plurality of scans;

rigging the 3D model for animation based on an alignment of the second plurality of primitives of the musculoskeletal framework and the first plurality of primitives of the 3D model; and animating the 3D model based on simulated contractions of one or more of the virtual muscles, wherein animating the 3D model comprises:

determining an association between primitives from the second plurality of primitives representing the one or more virtual muscles and aligned primitives of the first plurality of primitives; and adjusting the aligned primitives according to a movement created from the simulated contractions of the one or more virtual muscles.

* * * * *